E. GOLDBERGER.
SPRING MOUNTING FOR VEHICLES.
APPLICATION FILED JULY 13, 1917.

1,325,196.

Patented Dec. 16, 1919.
2 SHEETS—SHEET 1.

Inventor
Ernest Goldberger
By Ralzemond A. Parker
Attorney

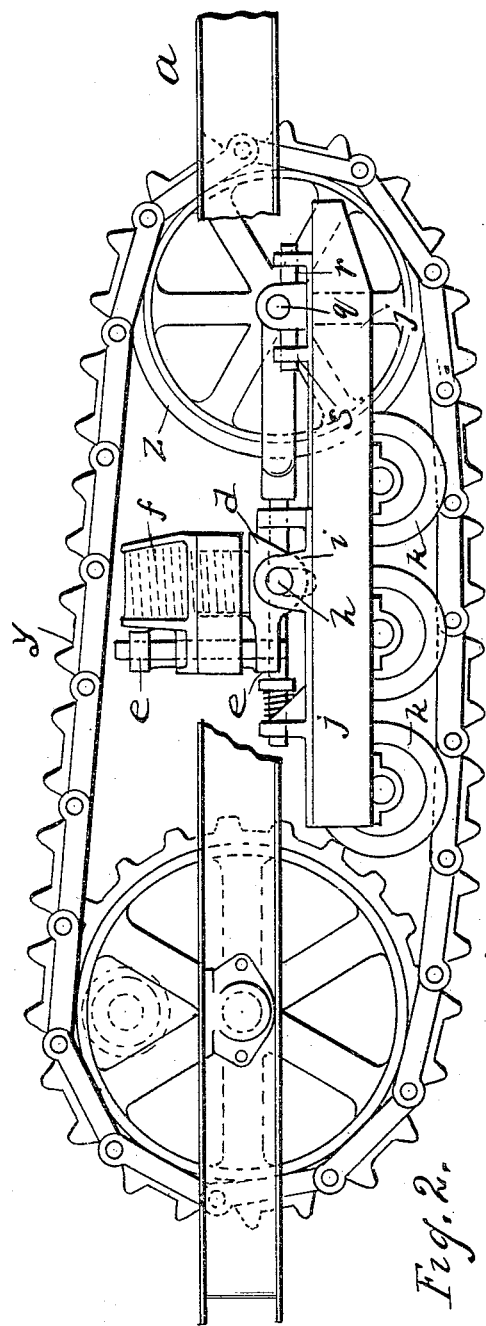
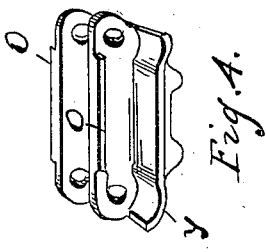
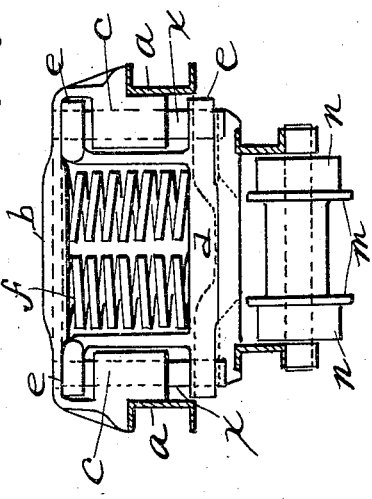

UNITED STATES PATENT OFFICE.

ERNEST GOLDBERGER, OF DETROIT, MICHIGAN.

SPRING-MOUNTING FOR VEHICLES.

1,325,196.  Specification of Letters Patent.  Patented Dec. 16, 1919.

Application filed July 13, 1917. Serial No. 180,319.

*To all whom it may concern:*

Be it known that I, ERNEST GOLDBERGER, a citizen of Austria-Hungary, residing at Detroit, county of Wayne, State of Michigan, have invented a certain new and useful Improvement in Spring-Mountings for Vehicles, and declare the following to be a full, clear, and exact description of the same, such as will enable others skilled in the art to which it pertains to make and use the same, reference being had to the accompanying drawings, which form a part of this specification.

This invention relates to the tractors of the track-laying type. The invention relates primarily to a suspension of the truck rollers upon a subframe which can have a relative up and down movement with respect to the chassis and also a swinging movement around a pivot and in a vertical plane relative to the chassis but which is guided in its vertical plane and therefore positively restrained from lateral movement.

In the drawings:

Fig. 2 is a side elevation of the driving gear at one side with some of the parts broken away.

Fig. 3 is a cross section of the same.

Fig. 4 is a perspective of one of the links used in the driving chain.

Figure 1:
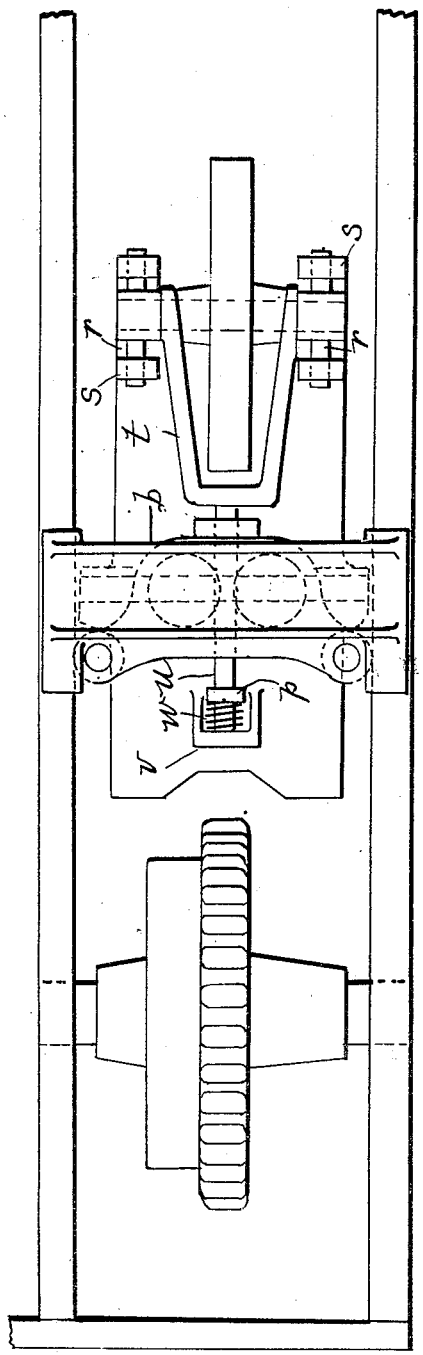
Figure 1 is a plan view of the driving gear at one side of the tractor.

*a* indicates the chassis of the tractor which is provided with the channel bars *a a*, two in connection with each track. By referring to Fig. 3, it will be seen that a yoke *b* rests at its ends upon the bars *a a*, and is provided with perforated lugs *c c* into which vertical pins are rigidly fitted. The spring saddle *d* is provided with four perforated lugs *e* that are slidable vertically on the pins and afford lower seats for the two coil springs *f* that serve as yielding spacers between the yoke *b* and the saddle *d*.

Now referring to Fig. 2, it will be seen that the saddle *d* is mounted at the bottom to rock on the rock shaft *h* which is supported in the lugs *i* upon the subframe *j* on whose lower side are journaled the truck rollers *k* provided each with two flanges *m* (Fig. 3) and two treads *n* which run on the two tracks *o o* of the links *y* (see Fig. 4). The pin and sleeve sliding arrangement *c, e* and *x* between subframe and chassis, and the lugs *i* when the subframe oscillates upon the rock shaft *h* preclude either lateral movement or twisting, which would be objectionable.

Turning to Figs. 1 and 2 it will be seen that I have also provided an arrangement for relative movement between the forward idler sprocket *z* and the subframe. The idler sprocket is rotatably supported by the journal *q* and this journal is slidably mounted on the rods *r r* supported on top of the subframe by the brackets *s*. A thrust yoke *t* carries the ends of the journal and is attached to the thrust rod *u* which plays through the bearings *v v* on the subframe. The spring *w* engages around this thrust rod between the rear bearing *v* and the adjusting nut *p*. Hence by changing the position of this adjusting nut *p* upon the thrust rod *u* the tension of the spring can be regulated so as to automatically maintain a constant and even tension in the track chain whether the irregularities over which the tractor has to pass have a tendency to stretch or shorten the length of the track chain. This arrangement, as it will be readily seen, serves to absorb a great part of many of the shocks received by the idler and track chain so as to avoid communicating them to the sprocket wheel and chassis. It also greatly relieves the track chain from excessive strain.

My invention is not only applicable to tractors of the track-laying variety but is also broadly applicable for suspending a chassis for up and down and swinging movement upon a single wheel.

What I claim is:

1. In a tractor of the track-laying type, the combination of a sprocket wheel, an idler sprocket wheel, a track chain running over the two sprocket wheels, truck rollers running on the tracks of said chain, a subframe supported on the rollers, a suspension device rockingly supported on the subframe, a chassis having a vertical sliding and guiding movement with respect to the suspension device, and springs interposed between the suspension device and the chassis frame, said subframe being unconnected with the chassis except through said suspension device.

2. In a tractor of the track-laying type and in driving gear thereof, the combination of a sprocket wheel, an idler sprocket wheel, a track chain running over the sprocket wheels, truck rollers running on the chain, a subframe supported on the rollers, a chassis, and a suspension device between the chassis and the truck frame, said suspension device comprising a journal rockingly supported on the truck frame, one or more spring seats, upright pins, lugs on said suspension device slidable on the pins to give a sliding vertical movement, said subframe being unconnected with the chassis except through said suspension device.

3. In a vehicle, the combination of a wheel, a chassis and a suspension device adapted to allow vertical relative swinging movement of the wheel and chassis in a longitudinal plane of the vehicle, one or more springs interposed between the suspension device and the chassis, said wheel being unconnected with the chassis except through said suspension device.

4. In a tractor of the track-laying type and in driving gear thereof, the combination of a driving sprocket, an idler sprocket, a track chain running over the sprockets, truck rollers, a journal for the idler sprocket, a yoke holding the idler journal and having three points connected with the subframe, all three of these points being guided and adapted to slide longitudinally in respect to said subframe and restrained from any other motion, and elastic spacing means between this yoke and the subframe to pick up lost motion in the track chain.

5. In a vehicle, the combination of a wheel, a chassis, and a device connecting the wheel to the chassis which comprises two parts; one, supported to rock in a vertical longitudinal plane with respect to the chassis, and the second part connected with the chassis and having a sliding vertical movement with respect to the first mentioned part, one or more springs interposed between the suspension device and the chassis, said wheel being unconnected with said chassis except through said suspension device.

In testimony whereof I sign this specification.

ERNEST GOLDBERGER.